United States Patent Office 3,766,057
Patented Oct. 16, 1973

3,766,057
PROCESS FOR THE CATALYTIC HYDROGENATION OF DISTILLATION RESIDUUM-CONTAINING HYDROCARBONS AND THE CATALYST COMPOSITION THEREFOR
Yutaka Oguchi, Tokyo, and Hirotsugu Nomura, Kawasaki, Japan, assignors to Nippon Oil Company, Ltd., Tokyo, Japan
No Drawing. Filed Dec. 6, 1971, Ser. No. 205,360
Claims priority, application Japan, Dec. 7, 1970,
45/107,635
Int. Cl. C10g 23/02
U.S. Cl. 208—143          6 Claims

ABSTRACT OF THE DISCLOSURE

A process for the catalytic hydrogenation of distillation residuum-containing petroleum hydrocarbons which comprises contacting the hydrocarbons with a hydrogenatively active metal catalyst supported on alumina or alumina-silica gels in the presence of hydrogen, wherein (a) the gel is a gelled product obtained by heating a sol solution selected from the group consisting of a hydrosol of basic aluminum sulfate and a mixture of such hydrosol with a hydrosol of silica,
(b) the gelled product has a surface area of 250–450 square meters per gram, a pore volume of 0.5–1.5 cubic centimeters per gram, and a mean pore radius of 40–100 angstroms, and
(c) in a certain 10 angstrom width within the mean pore radius range, there is a peak which accounts for greater than 15% of the pore volume.

This invention relates to an improved process by which the continuous catalytic hydrogenation of distillation residuum-containing petroleum hydrocarbons can be carried out efficiently and stably over a prolonged period of time with improved catalytic activity and catalyst life, and also to a catalyst composition for use in this process.

More particularly, the invention relates to a process for the catalytic hydrogenation of distillation residuum-containing petroleum hydrocarbons which comprises contacting the hydrocarbons with a known hydrogenatively active metal catalyst supported on an alumina or alumina-silica gel having a surface area of not less than 200 square meters per gram, as determined by the B.E.T. method, a pore volume of not less than 0.5 cubic centimeters per gram and a mean pore radius of not greater than 100 angstroms, in the presence of hydrogen; wherein the improvement resides in that (a) the gel is a gelled product obtained by heating a sol solution selected from the group consisting of a hydrosol of basic aluminum sulfate and a mixture of such hydrosol with a hydrosol of silica,
(b) the gelled product has a surface area of 250–450 square meters per gram, a pore volume of 0.5–1.5 cubic centimeters per gram, and a mean pore radius of 40–100 angstroms, and
(c) in a certain 10 angstrom width within the mean pore radius range, there is a peak which accounts for greater than 15% of the pore volume.

Further, the invention concerns a catalyst composition for use in the catalystic hydrogenation of distillation residuum-containing petroleum hydrocarbons, which consists essentially of a known hydrogenatively active metal catalyst supported on an alumina or alumina-silica gel having a surface area of not less than 200 square meters per gram, as determined by the B.E.T. methods, a pore volume of not less than 0.5 cubic centimeters per gram and a mean pore radius of not greater than 100 angstroms, and characterized in that (a) the gel is a gelled product obtained by heating a sol solution selected from the group consisting of a hydrosol of basic aluminum sulfate and a mixture of such hydrosol with a hydrosol of silica,
(b) the gelled product has a surface area of 250–450 square meters per gram, a pore volume of 0.5–1.5 cubic centimeters per gram, and a mean pore radius of 40–100 angstroms, and
(c) in a certain 10 angstrom width within the mean pore radius range, there is a peak which accounts for greater than 15% of the pore volume.

With regard to the catalytic hydrogenation of petroleum, numerous purification processes have been developed and are being operated in connection with those cases where distillate oil such as a light oil is used as the feed stock.

Lately, the catalytic hydrogenation of distillation residuum-containing petroleum hydrocarbons has aroused much interest and a number of proposals such as hereinafter given have been made.

However, it is known that in the case of the treatment of the fraction containing the distillation residual, continuous operation over a prolonged period of time is difficult owing to the shortness of the life of the catalyst attributable to a marked decline in the activity of catalyst due to the asphaltenes and metals contained in the feed stock. Thus, the development of a process which would make it possible to carry out the catalytic hydrogenation treatment stably and with excellent activity over a prolonged period of time has been desired.

It is also known that the distillation residual, and especially the asphaltenes contained therein, tend to cause the deposition of a carbonaceous material during the hydrogenation reaction and, in the conventional processes, the deposited carbonaceous material by blanketing the surface of the catalyst cause a decline in its catalytic activity. It is further known that the metals (chiefly vanadium and nickel) which are present in the distillation residual, and especially in the asphaltenes contained therein, also become deposited on the surface of the catalyst further aggravating the decline of the activity of the catalyst.

Thus, as hereinabove indicated, problems which did not exist in the catalytic hydrogenation of distillates containing essentially no distillation residuum have newly arisen in the catalytic hydrogenation of distillation residuum-containing petroleum hydrocarbons. A number of proposals which attempt to solve one or more of these technical problems are known.

As one of these proposals, British patent specification No. 933,663 (published on Aug. 8, 1963) is known. In this proposal it is pointed out that the method of preparing the catalyst determines its properties, and it is shown that two catalysts of the same nominal composition but prepared by different methods can have widely different properties. The use of particularly the "gamma" alumina, which is obtained by the calcination of alpha-alumina monohydrate and having a surface area of from 200 to 240 square meters per gram, an average pore diameter of from 70 to 100 angstroms (average pore radius of 35–50 angstroms), and preferably from 70 to 90 angstroms (average pore radius of 35–45 angstroms) is proposed. The patent indicates that the pore volume is broadly 0.3–0.6 cubic centimeters per gram, and preferably 0.4–0.5 cubic centimeters per gram.

While this proposal makes no particular mention of the foregoing problems that are experienced in connection with the catalytic hydrogenation of the distillation residuum-containing petroleum hydrocarbons, it states that the foregoing "gamma" alumina can be ultilized in the treatment of a broad range of gas oils. However, with regard to the surface area, it indicates a lower value than the lower limit specified by the present invention. And while the average pore diameter and pore volume specified broadly involves the neighborhood of the lower limit of the present invention, the range indicated is much lower.

Further, the patent states that it must be a "gamma" alumina obtained by the calcination of alpha alumina monohydrate; it does not permit the use of aluminas obtained by other methods. Especially, there is no recognition at all of the importance of the distribution of pore radius.

As a proposal which recognizes the foregoing problem in carrying out the catalytic hydrogenation of the distillation residuum-containing petroleum hydrocarbons and proposes a carrier for this purpose, there is U.S. Pat. 3,383,301 (patented May 14, 1968). In this proposal it is pointed out that as the alumina base carrier it is required that a major portion of the pore volume be in pores of less than 300 angstrom units radius and that by far the major portion of the total pore volume in these relatively small pores be found in pores having a radius from 0 to 120 angsgtrom units. Further, the patent indicates that for greater effectiveness in the desulfurization of residual stocks it is not only necessary to have a catalyst having a large concentration of pores of any particular size, but rather a catalyst having a relatively uniform, wide distribution of pores over the entire 0 to 120 angstrom radius range is necessary. The patent proposes a composite catalyst having not more than 15 percent of the volume of the pores having a radius in the range of 0 to 300 angstrom units in any 10 angstrom unit increment of pore radius in the range of pores having a 0 to 120 angstrom unit radius, and also having at least about 10 percent of such pore volume in pores having a radius of less than 30 angstrom units, at least 15 percent of such pore volume in pores having a radius greater than 30 angstrom units and less than 70 angstrom units, and at least 30 percent of such pore volume in pores having a radius greater than 70 angstrom units and less than 120 angstrom units.

This disclosure teaches that any 10 angstrom unit increment of pores radius in the range of pores having a 0 to 120 angstrom unit radius should not be greater than 15 percent of the pore volume of the pores having a radius in the range of 0 to 300 angstrom units. It further points out that the distribution of the pores over the entire 0 to 120 angstrom radius range should be uniform and wide, and that since the presence of a peak of distribution is of no concern as far as the effectiveness of the catalyst is concerned, the necessity for such a presence is denied. In addition, this disclosure recommends that the surface area of this composite catalyst be at least 100 square meters per gram.

In this disclosure it is seen that the necessity for the presence of a distribution peak of the pore volume in a certain pore radius range, i.e., the requirement (c), in combination with requirements (a) and (b) of the present invention, as hereinbefore indicated, is positively denied by the foregoing disclosure.

Further, U.S. Pat. 3,393,148 (patented July 16, 1968) sets forth a disclosure relating to the treatment of residual stocks. In this disclosure it is proposed to use as a carrier alumina having a surface area within the range of about 150 to about 500 square meters per gram, suitably within the range of about 300 to about 350 square meters per gram, and preferably within the range of about 320 to 340 square meters per gram, and having an average pore diameter within the range of about 100 to 200 angstroms (average pore radius within the range of about 50 to 100 angstroms). Further, it is recommended that the pore volume of this carrier be 0.54–2.36 cubic centimeters per gram.

In this disclosure there is a complete lack of awareness of the importance of the pore radius distribution not to mention requirement (c), i.e., the necessity for the presence of a distribution peak of the pore volume in a certain pore radius range in combination with requirements (a) and (b), which, as previously indicated, are required in the case of the present invention.

Research has been conducted with a view to overcoming these technical difficulties that arose in carrying out the catalytic hydrogenation of the distillation residuum-containing petroleum hydrocarbons. Having found that the gelled product obtained by the heat treatment of a sol solution selected from the group consisting of a hydrosol of basic aluminum sulfate and a mixture of such hydrosol with a hydrosol of silica was especially superior as a carrier material, the use of this carrier for achieving the objects of the present invention was further researched.

As a consequence, it was found that in using as the carrier the gelled product obtained by means of heat treating the aforesaid sol solution, the presence of a peak of the distribution of the pore radius, which had either been completely ignored or positively denied in the hereinabove described prior proposals, was of critical importance and that the performance of a catalyst using this type of carrier was governed by its meeting of the requirements as to surface area, pore volume and mean pore radius of requirement (b), above, and, in addition, the requirement as to the distribution of the pore radius within a specified mean pore radius range of requirement (c), above. It was found that even though requirements (a) and (b) are satisfied, the improvement of the present invention cannot be achieved unless requirement (c) is satisfied in combination with requirements (a) and (b).

It is therefore an object of the invention to provide an improved process for the catalytic hydrogenation of distillation residuum-containing petroleum hydrocarbons wherein the treatment can be carried out stably and efficiently over a prolonged period of time by a continuous process with an improved catalytic activity and a prolonged catalyst life, using as the carrier a gelled product obtained by heat treating a sol solution selected from the group consisting of a hydrosol of basic aluminum sulfate and a mixture of such hydrosol with a hydrosol of silica, upon which carrier is supported a known hydrogenatively active metal catalyst. Another object is to provide a catalyst composition for use in the foregoing process.

Other objects and advantages will become apparent from the following description.

The hydrosol solution of basic aluminum sulfate to be used for obtaining the gelled product of requirement (a), above, is obtained commercially as a supernatant in this invention by slowly adding finely divided calcium carbonate to a concentrated aqueous aluminum sulfate solution with vigorous stirring to precipitate the sulfuric radicals as calcium sulfate. Preferred is a molar ratio in the range of 0.8–1.6 for the $SO_3/Al_2O_3$ molar ratio of this aqueous solution. The combined solution of the hydrosol solution (aqueous colloidal solution) of basic aluminum sulfate and silica sol can be obtained by just mixing together the foregoing aqueous colloidal solution of basic aluminum sulfate with the silica sol. Such ions as $Na^+$, $K^+$, $Mg^+$, $Ca^{++}$, $Zn^{++}$, $Fe^{++}$ and $NH_4^+$ may be present as impurities in the starting aqueous aluminum sulfate solution.

Since the aqueous colloidal solution of basic aluminum sulfate and the combined solution of the aqueous colloidal solution of basic aluminum sulfate and silica sol has the property of gelling on heating, this property is utilized and a hydrogel is obtained. For promoting a uniform hydrogelation, it is preferred to add water in an amount of 10–30% by weight of the starting solution immediately before it is to be heated.

The hydrogelation can conveniently be carried out by a procedure of passing the combined hydrosol solution through a water-immiscible heating medium, e.g., a petroleum hydrocarbon, such as spindle oil and light oil, heated at a temperature of, for example, 40–100° C. A spherical hydrogel can be obtained by this method, since the hydrogel forms into a spherical shape as a result of its surface tension. In this case the size of the hydrogel, and therefore the size of the catalyst carrier, can be adjusted over wide limits by an adjustment of the size of the nozzle through which the starting solution is jetted into the heating medium, the difference in the specific gravities of the starting solution and the heating medium, the viscosity and surface tension of the starting solution, etc. When it is desired to obtain a perfectly spherical catalyst, the heating time must be strictly regulated, the time being determined by the temperature and the size of the hydrogel. Further, in order to prevent the formation of cracks during the hydrogelation process, the starting solution should preferably have any gas that happens to be dissolved therein removed before using the starting solution.

With a view to reducing the time required for the water-washing and neutralization operations, which follow the formation of the hydrogels, by accelerating the speed at which these operations are carried out, the hydrogels are preferably small in size. This is also true when other procedures are used for accomplishing the hydrogelation. For this purpose, methods similar to that described above can be followed and the starting solution can preferably be dispersed in a heating medium or be sprayed into a gas maintained at a constant temperature, thereby forming particles of small size or in some cases particles of minute size. However, it is not necessary to exercise any special care to ensure that the hydrogels obtained are perfectly spherical and uniform in particle diameter as well as without cracks.

The as-formed hydrogel is very unstable and has the property of reverting to the sol solution if left to stand. Therefore, it must be hydrolyzed by pouring water or hot water over it to thereby remove a part of the sulfuric radicals and reduce the molar ratio of $SO_3/Al_2O_3$ to preferably about 0.4–0.7. The hydrogel is not only stabilized by this operation but the impure salts contained in the starting solution are also removed.

Next, the hydrogel is preferably contacted with an aqueous alkaline solution to raise its pH and thereby remove the remaining sulfuric radicals as sulfates. When it is desired to obtain perfectly spherical hydrogels, the pH must be raised gradually. If the pH is raised abruptly at this time, adverse effects are had on the hydrogels in that cracks are formed or there is a tendency to their breakage during drying or their breakage as a result of a decline in their pressure resistant strength or attrition resistance. As the alkali for the foregoing pH adjustment, a substance which does not cause any alkali metal or alkaline earth metal to remain in the hydrogel, e.g., ammonia water is preferably used. After completion of the alkaline treatment, the sulfuric radicals are preferably removed as completely as possible by water-washing. As a result either alumina hydrogels or alumina-silica hydrogels whose water content is 60–99 weight percent is obtained.

To obtain a catalyst carrier from the alumina hydrogel or alumina-silica hydrogel obtained as hereinbefore described, the following methods can be employed. For example, there is a method in which the spherical hydrogels are dried and calcined, a method in which the hydrogels have their water content reduced to such an extent as to be suitable for extrusion molding and they are then molded, dried and calcined, or a method in which water and nitric acid are added to the gel obtained by drying the minute particles of hydrogel and then this mixture is triturated and thereafter molded, dried and calcined.

The drying of the spherical hydrogels is preferably carried out slowly in the presence of saturated steam, since cracks are formed in the hydrogels if the drying is carried out too rapidly.

The alumina or alumina-silica carrier to be used in this invention, in addition to being a gelled product obtained, as hereinbefore described, by heating a sol solution selected from the group consisting of a hydrosol of basic aluminum sulfate and a mixture of such hydrosol with a hydrosol of silica, must satisfy the following conditions (b) and (c); namely:

(b) the gelled product has a surface area of 250–450 square meters per gram, a pore volume of 0.5–1.5 cubic centimeters per gram, and a mean pore radius of 40–100 angstroms,
(c) in a certain 10 angstrom width within the mean pore radius range, there is a peak which accounts for greater than 15% of the pore volume.

When the carrier used is one whose surface area is below 250 square meters per gram, the desired activity is not obtained. On the other hand, in the case of a carrier having a surface area exceeding 450 square meters per gram, the pore volume must be made exceedingly great to maintain a mean pore radius in the range of 40–100 angstroms. Therefore, this is not desirable from the standpoint of the strength of the carrier.

Where the pore volume is less than 0.5 cubic centimeter per gram, the surface area must be made exceedingly small or else a mean pore radius of 40–100 angstroms cannot be maintained. Since the activity is reduced when the surface area becomes small, as hereinabove noted, this is not desirable. On the other hand, in the case of a carrier having a pore volume greater than 1.5 cubic centimeters per gram, its preparation is difficult from the practical standpoint such as the strength of such a carrier.

When the carrier used is one whose mean pore radius is less than 40 angstroms, the desired catalyst life cannot be obtained, whereas in the case where the mean pore radius is greater than 100 angstroms, the pore volume must be made greater than 1.5 cubic centimeters per gram for maintaining a surface area above 250 square meters per gram. For the reasons previously noted, this is not desirable.

On the other hand, when the carrier used is one which has no 10 angstrom increment in the range of pore radius between 40 and 100 angstroms, which accounts for at least 15% of the total pore volume, the desired values are not exhibited in activity or life of the catalyst, even though the foregoing requirements (a) and (b) are satisfied.

To ensure that the above-noted properties are possessed by the alumina or alumina-silica carrier obtained using as the starting material the alumina hydrogel or alumina-silica hydrogel that has been obtained by heat-gelling either a hydrosol of basic aluminum sulfate or a combined solution of hydrosol of basic aluminum sulfate and a silica sol, care must be exercised with reference to, for example, the following points in the step of preparing the carrier.

The pore volume and pore radius of the carrier are greatly affected by the manner in which the step of removing the sulfuric radicals after heat-gelling process as well as the following drying step is carried out. That is, the pore volume and the pore radius can be increased by treating the hydrogels with dilute ammonia water before carrying out the main alkaline treatment or by raising the pH gradually during the main alkaline treatment step. With regard to the drying step, the more slowly the drying is carried out during a prolonged period of time in a high humidity and temperature atmosphere, the greater the pore radius becomes.

Further, the pore radius and surface area tend to become greater when the combined solution of a hydrosol of basic aluminum sulfate and a silica sol is used as the starting solution instead of the hydrosol of basic aluminum sulfate.

Again, where the extrusion molding of the hydrogel is to be caried out, there is a tendency that, as the water content becomes proportionally smaller in the step of extrusion molding the hydrogel after it has been kneaded and then dried by heating, the pore radius becomes greater and the surface area becomes smaller.

Further, in the case where extrusion molding is carried out using a powder gel, there is a tendency that the pore radius becomes smaller as the water added is increased.

By a suitable choice and combination of these treatment conditions, a carrier having the properties of requirements (b) and (c) can be obtained.

Next, the alumina or alumina-silica carrier obtained in the manner described hereinbefore is impregnated with an aqueous solution of a hydrogenatively active metal compound and then usually dried and calcined to obtain the catalyst.

As the hydrogenatively active metals, one or more classes of the various known metals that can be used as a hydrorefining catalytic, such, for example, as a metal selected from Groups VI and VIII of the Periodic Table are usable. Especially suitable are such metals as cobalt, nickel, molybdenum and tungsten.

The catalyst metal is usually supported in an amount of about 5–20 weight percent.

In effecting the deposition of the foregoing catalyst metal component on the carrier, the impregnation, drying and calcination are carried out in customary manner. However, since an effective activity is not demonstrated if the calcination temperature is too low, the calcination should preferably be conducted at a temperature above 350° C. Usually, a temperature range on the order of 350–600° C. is employed.

When the foregoing catalyst is used in the hydrogenation of the hydrocarbons containing the petroleum distillation residual, as well as an asphaltene and metals, its duration of activity is very great as compared with the conventional catalysts.

The invention process can be carried out either continuously or batchwise. Further, in carrying out the process continuously, the various known methods such as the fixed, moving or fluidized bed technique can be employed.

While the catalyst may be used in its as-obtained state, presulfiding may also be carried out. The presulfiding of the catalyst can be carried out in customary manner.

The reaction conditions in carrying out the hydrodesulfurization of the distilation residuum-containing petroleum hydrocarbons usually range as follows: temperature 300–500° C., pressure 50–300 kg./cm.$^2$ g., liquid hourly space velocity of the feedstock oil 0.2–5 vol./vol./hr., and flow rate ratio of hydrogen to feedstock oil 300–3000 liter-NTP/liter; an optimum combination of the various conditions being chosen in accordance with the properties of the feedstock oil and the properties required in the resulting product.

The desulfured oil leaving the reaction column, after separation of the gas, is submitted to steam stripping, reduced pressure steam stripping, vacuum or atmospheric distillation, or a combination of these treatments to obtain the final product.

The following examples are given for a further illustration of the setup and effects of the invention more specifically, it being understood that the invention is not intended to be limited by these examples.

EXAMPLE 1

Finely divided calcium carbonate was slowly added at room temperature to a saturated aqueous aluminum sulfate solution with vigorous stirring to obtain as a supernatant an aqueous colloidal solution of basic aluminum sulfate containing 121.3 grams per liter of $Al_2O_3$ and 116.5 grams per liter of $SO_3$ (molar ratio of $$SO_3/Al_2O_3 = 1.22).$$

After removing the gas dissolved in this sol by de-aerating it for 5 hours under reduced pressure, water was added thereto in an amount of 200 cc. per liter of the sol. This liquid was then immediately added dropwise from the top into a tank filled with spindle oil to a height of 8 meters and maintained at a temperature of 70° C., thereby forming spherical hydrogels 1–2 mm. in diameter. The hydrogels were then transferred to a tank filled with water and were water-washed for 24 hours with a continuous flow of fresh hot water to remove a part of the sulfuric radicals that were present in the hydrogels. On completion of th water-washing, the molar ratio of $SO_3/Al_2O_3$ of the hydrogel was reduced to 0.65.

Next, a tank in which the alumina hydrogels were placed was filled with very dilute ammonia water (pH 7.6), which was then heated to a temperature of 45° C., followed by withdrawal of the ammonia water. This operation was repeated twice. To the tank containing the hydrogels which had been thus washed with the very dilute ammonia water, ammonia water of 0.3% concentration was added. After heating this to a temperature of 55° C., the liquid was withdrawn. As a result of having repeated this operation for 8 times, the pH was gradually raised up to 8.5, and the remaining sulfuric radicals were converted to ammonium sulfate. This was followed by water-washing the hydrogels until no sulfuric radicals could be detected to obtain the spherical alumina hydrogels.

The so obtained alumina hydrogels were dried by heating at about 100° C. while being kneaded in a kneader. When the water content was reduced to 42 weight percent (120° C. dry basis), the mass was extrusion molded. The extrusion molded product was then dried at 110° C. for about 5 hours and thereafter calcined at 550° C. for 3 hours to obtain the carrier (Example 1).

By way of comparison, 4 N ammonia water was slowly added at room temperature to a 10% aqueous aluminum nitrate solution until a pH of 9.5 was reached. After allowing this mixture to stand for 24 hours, it was separated by filtration and washed to obtain an alumina hydrogel, which was extrusion molded, dried at 110° C. for 5 hours and thereafter calcined at 550° C. for 3 hours to obtain a carrier (Control 1).

The properties of the carriers of Example 1 and Control 1 are shown in Table 1.

TABLE 1

|  | Example 1 | Control 1 |
| --- | --- | --- |
| Surface area (m.$^2$/g.) | 274 | 276 |
| Pore volume (cc./g.) | 0.630 | 0.495 |
| Average pore radius (A.) | 46 | 36 |

| | Pore radius (A.) | Pore volume (percent) | Pore radius (A.) | Pore volume (percent) |
| --- | --- | --- | --- | --- |
| Pore distribution | 300–70 | 4.8 | 300–60 | 2.0 |
| | 70–60 | 2.4 | 60–50 | 4.0 |
| | 60–50 | 4.8 | 50–40 | 8.1 |
| | 50–40 | 62.7 | 40–30 | 78.8 |
| | 40–30 | 15.9 | 30–20 | 7.1 |
| | 30–20 | 9.4 | 20–10 | 0 |
| | 20–10 | 0 | | |

As can be seen from Table 1, the surface areas of both carriers of Example 1 and Control 1 are about the same, but in the case of Example 1 the pore volume is about 0.5 cc. per gram and the average pore radius is above 40 angstroms, whereas in the case of Control 1 the pore volume is below 0.5 cc. per gram and the average pore radius is below 40 angstroms.

Next, to 271.4 grams of ammonium paramolybdate 290 cc. of water were added and thereafter 550 cc. of ammonia water of 28% concentration were added with stirring to accomplish the complete dissolution of the salt. Separately, an aqueous solution of cobalt nitrate was prepared by dissolving 214.3 grams of cobalt nitrate in 220 cc. of water. Then the cobalt nitrate solution was slowly added dropwise to the ammonium molybdate solution with stirring.

600 cc. of the so obtained combined solution were then used in impregnating the carrier of Example 1 (extrusion-molded products 1.3 mm. in diameter) and the carrier of Control 1 (similarly extrusion-molded products 1.3 mm. in diameter). Impregnation of each carrier with 300 cc. of the foregoing solution was accomplished by dipping the carrier in the solution for 3 hours followed by drying at 110° C. for 5 hours and finally calcining at 500° C. for 3 hours. The metal content of the so obtained catalysts were 8.9–9.1 weight percent molybdenum and 2.5–2.7 weight percent cobalt.

The hydrorefining of Iranian heavy atmospheric pressure distillation residual oil was carried by means of a fixed bed reaction column, using the foregoing catalysts.

The properties of the feed stock oil used are shown in Table 2.

TABLE 2

| | |
|---|---|
| Specific gravity ($d_4^{15}$) | 0.960 |
| Viscosity (@ 50° C., cst.) | 328.7 |
| Residual carbon (wt. percent) | 9.29 |
| Ash (wt. percent) | 0.033 |
| Asphaltenes (wt. percent) | 4.58 |
| Sulfur (wt. percent) | 2.43 |
| Pour point (° C.) | +17.5 |
| V (p.p.m.) | 126 |
| Ni (p.p.m.) | 38 |
| N (wt. percent) | 0.37 |

After the catalyst was packed in the reaction column, before its use, it was presulfided at a temperature of 370° C. and atmospheric pressure using hydrogen containing 3 mol percent of hydrogen sulfide. The reaction conditions used were: a temperature of 380° C., a pressure of 150 kg./cm. g. liquid hourly space velocity of the feed stock oil of 0.8 vol./vol./hr., and a flow rate ratio of hydrogen to feed stock oil of 1000 liter-NTP/liter. The refined oil leaving the reaction column was submitted to system stripping under reduced pressure to distill off and eliminate the hydrogen sulfide and other gases as well as the decomposable light oils. Thus the final product was obtained.

TABLE 3

| | Total sulfur (wt. percent) | | | | |
|---|---|---|---|---|---|
| Experiment | Feed stock oil | After 50 hours | After 100 hours | After 500 hours | After 1,000 hours |
| Example 1 | 2.43 | 0.50 | 0.55 | 0.59 | 0.72 |
| Control 1 | 2.43 | 0.49 | 0.63 | 0.97 | 1.24 |

The changes in the total sulfur content of the product up to 1000 hours after the start of the test are shown in Table 3. Further, the properties of the product at a point 500 hours after the start of the test are shown in Table 4.

As is apparent by means of a comparison with Control 1, the catalyst prepared in accordance with the present invention maintains its activity over a much longer period of time.

EXAMPLE 2

Finely divided calcium carbonate was slowly added at room temperature to a saturated aqueous aluminum sulfate solution with vigorous stirring to obtain as a supernatant an aqueous colloidal solution of basic aluminum sulfate containing 118.7 grams per liter of $Al_2O_3$ and 105.7 grams per liter of $SO_3$ (molar ratio of $SO_3/Al_2O_3$ =1.13).

After removing the gas dissolved in this sol by deaerating it for 4 hours under reduced pressure, water was added thereto in an amount of 250 cc. per liter of the sol. This liquid was then immediately added dropwise from the top into a tank filled with a light oil to a height of 10 meters and maintained at a temperature of 80° C. As a result spherical hydrogels 3–5 mm. in diameter were formed. The hydrogels were then transferred to a tank filled with water and were water-washed for 24 hours with a continuous flow of hot water to thus remove a part of the sulfuric radicals present in the hydrogels. On completion of the water-washing, the molar ratio of $SO_3/Al_2O_3$ of the hydrogel was reduced to 0.61.

Next, a tank in which the alumina hydrogels were placed was filled with very dilute ammonia water (pH 7.5), which was then heated to a temperature of 50° C. followed by withdrawal of the ammonia water. This operation was repeated twice. To the tank containing the hydrogels, which had been thus washed with the very dilute ammonia water, ammonia water of a concentration of 0.3% was added. After heating this to a temperature of 55° C., the liquid was withdrawn. As a result of having repeated this operation ten times, the pH was gradually raised up to 8.5, and the remaining sulfuric radicals were converted to ammonium sulfate. This was followed by water-washing the hydrogels until no sulfuric radicals could be detected to obtain the spherical alumina hydrogels.

The so-obtained hydrogels were dried for 25 hours in a substantially closed constant temperature tank of 120° C. This was followed by calcining the hydrogels at 550° C. for 3 hours to thereby obtain the spherical alumina carrier 1.5–2.5 mm. in diameter (Example 2).

By way of comparison, 1000 grams of commercial finely divided aluminum hydroxide, 800 grams of water and 16 grams of 60% nitric acid were mixed, and the mixture was triturated for about 10 minutes. The mixture was then extrusion molded into a desired shape with a molder followed by drying the formed material at 120° C. for 20 hours and thereafter calcining at 600° C. for 2 hours to obtain an extrusion molded carrier 1.2–1.5 mm. in diameter (Control 2).

TABLE 4

| Experiment | Total sulfur (wt. percent) | Viscosity at 50° C., cst. | Residual carbon (wt. percent) | Asphaltenes (wt. percent) | V (p.p.m.) | Ni (p.p.m.) | N Wt. (percent) |
|---|---|---|---|---|---|---|---|
| Feed stock oil | 2.43 | 328.7 | 9.29 | 4.58 | 126 | 38 | 0.37 |
| Example 1 | 0.59 | 120.6 | 5.32 | 2.60 | 38 | 13 | 0.27 |
| Control 1 | 0.97 | 188.1 | 6.81 | 3.40 | 59 | 17 | 0.30 |

The properties of the carrier of Example 2 and Control 2 are shown in Table 5.

TABLE 5

| | Example 2 | | Control 2 | |
|---|---|---|---|---|
| Surface area (m.²/g.) | 323 | | 225 | |
| Pore volume (cc./g.) | 0.935 | | 1.325 | |
| Average pore radius (Å.) | 58 | | 118 | |
| | Pore radius (Å.) | Pore volume (percent) | Pore radius (Å.) | Pore volume (percent) |
| Pore distribution | 300–100 | 7.5 | 300–190 | 13.5 |
| | 100–90 | 2.7 | 190–180 | 5.2 |
| | 90–80 | 4.3 | 180–170 | 7.8 |
| | 80–70 | 7.5 | 170–160 | 10.1 |
| | 70–60 | 14.4 | 160–150 | 14.3 |
| | 60–50 | 33.1 | 150–140 | 10.6 |
| | 50–40 | 20.9 | 140–130 | 6.8 |
| | 40–30 | 9.6 | 130–120 | 4.5 |
| | 30–10 | 0 | 120–110 | 3.8 |
| | | | 110–60 | 15.1 |
| | | | 60–50 | 3.0 |
| | | | 50–40 | 2.5 |
| | | | 40–30 | 1.9 |
| | | | 30–20 | 0.8 |
| | | | 20–10 | 0 |

As is apparent from Table 5, the surface area of the carrier of Example 2 is great and its pore radius averages 58 Angstroms, whereas the average pore radius of the carrier of Control 2 is above 100 angstroms, and its surface area is below 250 square meters per gram.

Next, catalysts were prepared as in Example 1, using the carriers of Example 2 (spheres 2 mm. in diameter) and Control 2 (spheres 1.3 mm. in diameter formed by extrusion molding). The metal content of the catalysts obtained in this manner was 9.9–10.1 weight percent molybdenum and 2.8–3.1 weight percent cobalt.

The hydrorefining of Arabian medium atmospheric pressure distillation residual oil was carried out by means of a fixed bed reaction column, using the foregoing catalysts.

The properties of the feed stock oil used are shown in Table 6.

TABLE 6

| | |
|---|---|
| Specific gravity ($d_4^{15}$) | 0.965 |
| Viscosity (50° C., cst.) | 234.0 |
| Residual carbon (wt. percent) | 9.54 |
| Ash (wt. percent) | 0.002 |
| Asphaltenes (wt. percent) | 48.2 |
| Sulfur (wt. percent) | 3.70 |
| Pour point (° C.) | +7.5 |
| V (p.p.m.) | 31 |
| Ni (p.p.m.) | 12 |
| N (wt. percent) | 0.27 |

In carrying out the refining, the presulfiding method and the reaction conditions employed in Example 1 were used, except that a reaction temperature of 370° C. was used.

The changes in the total sulfur up to 1000 hours after the start of the test are shown in Table 7. The properties of the product at a point 500 hours after the start of the test are shown in Table 8.

TABLE 7

| | Total sulfur (wt. percent) | | | | |
|---|---|---|---|---|---|
| Experiment | Feed stock oil | After 50 hours | After 100 hours | After 500 hours | After 1,000 hours |
| Example 2 | 3.70 | 0.68 | 0.80 | 0.87 | 0.93 |
| Control 2 | 3.70 | 1.31 | 1.45 | 1.53 | 1.60 |

TABLE 8

| Experiment | Total sulfur (wt. percent) | Viscosity at 50° C., cst. | Residual carbon (wt. percent) | Asphaltenes (wt. percent) | V (p.p.m.) | Ni (p.p.m.) | N (wt. percent) |
|---|---|---|---|---|---|---|---|
| Feed stock oil | 3.70 | 234.0 | 9.54 | 4.82 | 31 | 12 | 0.27 |
| Example 2 | 0.87 | 92.35 | 5.75 | 2.32 | 10 | 6 | 0.08 |
| Control 2 | 1.53 | 134.3 | 6.83 | 2.95 | 15 | 7 | 0.11 |

It can thus been seen that, when compared with the catalyst of Control 2, the catalyst prepared in accordance with the present invention has an exceedingly great activity.

EXAMPLE 3

Finely divided calcium carbonate was slowly added at room temperature to a saturated aqueous aluminum sulfate solution with vigorous stirring to obtain as a supernatant an aqueous colloidal solution of basic aluminum sulfate containing 108.5 grams per liter of $Al_2O_3$ and 86.8 grams per liter of $SO_3$ (molar ratio of $SO_3/Al_2O_3=1.02$). This solution and a silica sol containing 1.6 grams per liter of $SiO_2$, after having been separately removed of their dissolved gas by deaeration for 3 hours under reduced pressure, were intimately mixed in amounts of 1 liter of the former and 100 cc. of the latter.

This combined solution was then added dropwise to a light oil heated at 90° C., using an apparatus identical to that used in Example 2, to thereby form spherical hydrogels 3–5 mm. in diameter. The so formed hydrogels were withdrawn via a pipe and transferred to another tank filled with water. The hydrogels were submitted in the tank to an operation consisting of adding fresh hot water followed by discarding the water, this operation being repeated eight times. As a result of this operation, a part of the sulfuric radicals bonded to the hydrogels was caused to flow out by means of hydrolysis and the molar ratio of $SO_3/Al_2O_3$ of the hydrogel was reduced to 0.53. After draining off the water, water was again added in an amount such as to submerge the hydrogels, and the pH was adjusted to 9.5–9.7 by adding 28% ammonia water very slowly dropwise, followed by heating for 10 hours at 50° C. The sulfuric radicals remaining in the hydrogel were converted to ammonium sulfate by this operation and separated from the hydrogel. This was followed by washing in water until no sulfuric radicals could be detected.

The hydrogels were then dried for 30 hours in a substantially closed 120° C. constant temperature tank and thereafter calcined at 550° C. for 3 hours to obtain the spherical alumina-silica carriers 1.5–2.5 mm. in diameter (Example 3).

By way of comparison, a combined solution of an aqueous colloidal solution of aluminum sulfate and silica sol obtained as in Example 3 was added dropwise as in Example 3 into a light oil to obtain spherical hydrogels 3–5 mm. in diameter. The so obtained hydrogels were transferred to a tank filled with water and water-washed for 24 hours with a continuous flow of fresh hot water to thereby remove a part of the sulfuric radicals contained in the hydrogels by hydrolysis. On completion of the water-washing, the molar ratio of $SO_3/Al_2O_3$ of the hydrogel was 0.65.

Next, ammonia water of 5% concentration was added to the tank containing the alumina-silica hydrogels while circulating therein hot water of 55° C. Thus the pH was raised to 9.2 from 3.8 during a 20-hour period. This was followed by washing the hydrogels with water until no further sulfuric radicals could be detected. The hydrogels were then dried for 50 hours in a substantially closed 120° C. constant temperature tank and thereafter calcined at 550° C. for 3 hours to obtain the spherical alumina-silica carriers of 1.5–2.5 mm. diameter (Control 3).

The properties of the carriers of Example 3 and Control 3 are shown in Table 9.

TABLE 9

| | Example 3 | | Control 3 | |
|---|---|---|---|---|
| Surface area (m.²/g.) | 310 | | 200 | |
| Pore volume (cc./g.) | 1.175 | | 0.845 | |
| Average pore radius (A.) | 75.8 | | 85 | |
| | Pore radius (A.) | Pore volume (percent) | Pore radius (A.) | Pore volume (percent) |
| Pore distribution | 300–130 | 8.5 | 300–100 | 37.9 |
| | 130–120 | 3.4 | 100–90 | 8.3 |
| | 120–110 | 4.7 | 90–80 | 12.4 |
| | 110–100 | 6.0 | 80–70 | 12.4 |
| | 100–90 | 11.1 | 70–60 | 8.9 |
| | 90–80 | 16.6 | 60–50 | 7.1 |
| | 80–70 | 17.4 | 50–40 | 4.7 |
| | 70–60 | 12.8 | 40–30 | 4.2 |
| | 60–50 | 8.1 | 30–20 | 4.1 |
| | 50–40 | 6.8 | 20–10 | 0 |
| | 40–30 | 4.6 | | |
| | 30–10 | 0 | | |

As is apparent from Table 9, not only is the surface area of the carrier of Example 3 great, but also it has a pore distribution in which the 90-80 and 80-70 angstrom increments each account for above 15% of the total pore volume. On the other hand, the surface area of the carrier of Control 3 not only is small, but also no 10 angstrom increment included in the 40-100 angstrom range of the pore distribution would account for above 15% of the total pore volume.

Next, 178.2 cc. of water were added to 263.4 grams of ammonium paramolybdate, after which 718.2 cc. of 28% ammonia water were added with stirring to effect the complete dissolution of the ammonia paramolybdate. Separately, an aqueous solution in 207.5 cc. of water of 234.2 grams of cobalt nitrate and 117 grams of nickel nitrate was prepared. The latter solution containing the cobalt and nickel nitrates was then slowly added dropwise to the former solution of ammonium molybdate with stirring. 700 cc. of the so obtained combined solution were used, and the carrier of Example 3 (2-mm. spheres) and Control 3 (2-mm. spheres) prepared by the procedures described hereinabove were each impregnated with this solution by immersion of each carrier in 350 cc. of the solution for 3 hours followed by drying at 110° C. for 5 hours and thereafter calcining at 500° C. for 3 hours. The active metal content of the so obtained catalyst was 9.7–10.2 weight percent molybdenum, 2.8–3.1 weight percent cobalt and 1.4–1.5 weight percent nickel.

The hydrorefining of Arabian light atmospheric pressure distillation residual oil was carried out using a fixed bed apparatus packed with the above catalysts. The properties of the feed stock oil are shown in Table 10.

TABLE 10

Specific gravity ($d_4^{15}$) _____ 0.945
Viscosity (@ 50° C., cst.) _____ 108.9
Residual carbon (wt. percent) _____ 7.67
Ash (wt. percent) _____ 0.004
Asphaltenes (wt. percent) _____ 2.48
Total sulfur (wt. percent) _____ 2.81
Pour point (° C.) _____ +7.5
V (p.p.m.) _____ 25
Ni (p.p.m.) _____ 5
N (wt. percent) _____ 0.14

The presulfiding of the catalyst was not performed in either instance, and the reaction was carried out under the following conditions: temperature of 360° C., pressure of 120 kg./cm.² g., liquid space velocity of the feed stock oil of 1 vol./vol./hr., and flow ratio of hydrogen to feed stock oil of 900 liter-NTP-liter. The refined oil leaving the reaction column was steam stripped to remove by distillation the hydrogen sulfide and other gases as well as decomposable light oils. As a result the final product was obtained.

The change in the total sulfur content up to 1000 hours after the start of the test is shown in Table 11. Further, the properties of the product at a point 500 hours after the start of the test are shown in Table 12.

TABLE 11

| Experiment | Total sulfur (wt. percent) | | | | |
|---|---|---|---|---|---|
| | Feed stock oil | After 50 hours | After 100 hours | After 500 hours | After 1,000 hours |
| Example 3 | 2.81 | 0.61 | 0.72 | 0.76 | 0.81 |
| Control 3 | 2.81 | 0.75 | 0.88 | 0.93 | 0.95 |

As can be seen by a comparison with the catalyst of Control 3, the activity of the catalyst prepared in accordance with the present invention is great.

EXAMPLE 4

A combined solution of an aqueous colloidal solution of aluminum sulfate and a silica sol obtained as in Example 3 was jetted in a constant temperature atmosphere maintained at 90° C. by the circulation of heated air, whereupon hydrogels of small particle diameter were obtained. The so obtained hydrogels were then treated as in Example 3 and thereafter dried during a period of 15 hours in a substantially closed 120° C. constant temperature tank to thereby obtain a finely divided gel.

One kg. of this finely divided gel was mixed with 1 kg. of water and 15 grams of 60% nitric acid, after which the mixture was triturated for 10 minutes and then extrusion molded with a molder. After drying the extrusion molded product at 120° C. for 20 hours, it was thereafter calcined at 600° C. for 2 hours. As a result, alumina-silica carriers (Example 4) were obtained.

By way of comparison, the hydrogels of small particle diameter obtained as in Example 4, above, were treated as in Control 3 and thereafter dried during a 25-hour period in a substantially closed 120° C. constant temperature tank to obtain a finely divided gel.

One kg. of this finely divided gel was mixed with 0.7 kg. of water and 20 grams of 60% nitric acid and, after the mixture was triturated for 10 minutes, it was extrusion molded with a molder. After drying the extrusion molded product at 120° C. for 20 hours, it was calcined at 600° C. for 2 hours to obtain the alumina-silica carrier (Control 4).

The properties of carriers obtained in Example 4 and Control 4 are shown in Table 13.

TABLE 13

| | Example 4 | | Control 4 | |
|---|---|---|---|---|
| Surface area (m.²/g.) | 266 | | 238 | |
| Pore volume (cc./g.) | 1.250 | | 1.125 | |
| Average pore radius (A.) | 94 | | 95 | |
| | Pore radius (A.) | Pore volume (percent) | Pore radius (A.) | Pore volume (percent) |
| Pore distribution | 300–130 | 11.2 | 300–200 | 26.7 |
| | 130–120 | 3.2 | 200–100 | 35.6 |
| | 120–110 | 4.8 | 100–90 | 3.6 |
| | 110–100 | 15.6 | 90–80 | 4.0 |
| | 100–90 | 24.4 | 80–70 | 4.0 |
| | 90–80 | 9.6 | 70–60 | 4.4 |
| | 80–70 | 7.6 | 60–50 | 4.4 |
| | 70–60 | 6.4 | 50–40 | 4.9 |
| | 60–50 | 5.6 | 40–30 | 8.8 |
| | 50–40 | 5.2 | 30–20 | 3.6 |
| | 40–30 | 4.8 | 20–10 | 0 |
| | 30–20 | 1.6 | | |
| | 20–10 | 0 | | |

As can be seen from Table 13, the pore volumes and average pore radius of the carriers of Example 4 and Control 4 are about the same, but while in the carrier of Example 4 the amount of pores distributed in the 100–90 angstrom increment account for more than 15% of the total pore volume, no pore volumes of a 10 angstrom increment included in the 40–100 angstrom range account for more than 15% of the total pore volume in the case of the carrier of Control 4. In addition, the surface area of the latter carrier is also small.

TABLE 12

| Experiment | Total sulfur (wt. percent) | Viscosity at 50° C., cst. | Residual carbon (wt. percent) | Asphaltenes (wt. percent) | V (p.p.m.) | Ni (p.p.m.) | N (wt. percent) |
|---|---|---|---|---|---|---|---|
| Feed stock oil | 2.81 | 108.9 | 7.67 | 2.48 | 25 | 5 | 0.14 |
| Example 3 | 0.76 | 65.34 | 4.01 | 0.93 | 8 | 3 | 0.09 |
| Control 3 | 1.13 | 78.91 | 4.95 | 1.18 | 11 | 4 | 0.11 |

Next, catalysts were prepared as in Example 3, using the carriers of Example 4 (extrusion molded product 1.3 mm. in diameter) and Control 4 (extrusion molded product similarly 1.3 mm. in diameter). The metal contents of the so obtained catalysts were 10.3–10.7 weight percent of molybdenum, 3.0–3.3 weight percent of cobalt and 1.6–1.7 weight percent of nickel.

The hydrorefining of Iranian light atmospheric pressure distillation residual oil was carried out by means of a fixed bed reaction column using the foregoing catalysts.

The properties of the feed stock oil used are shown in Table 14.

TABLE 14

| | |
|---|---|
| Specific gravity ($d_4^{15}$) | 0.944 |
| Viscosity (@ 50° C., cst.) | 133.9 |
| Residual carbon (wt. percent) | 6.63 |
| Ash (wt. percent) | 0.021 |
| Asphaltenes (wt. percent) | 1.37 |
| Total sulfur (wt. percent) | 2.36 |
| Pour point (° C.) | +22.5 |
| V (p.p.m.) | 65 |
| Ni (p.p.m.) | 16 |
| N (wt. percent) | 0.25 |

The reaction was carried out under conditions identical to those of Example 3. The change in the total sulfur content up to 1000 hours after the start of the test is shown in Table 15, while the properties of the product at a point 500 hours from the start of the reaction are shown in Table 16.

TABLE 15

| | Total sulfur (wt. percent) | | | | |
|---|---|---|---|---|---|
| Experiment | Feed stock oil | After 50 hours | After 100 hours | After 500 hours | After 1,000 hours |
| Example 4 | 2.36 | 0.45 | 0.51 | 0.62 | 0.68 |
| Control 4 | 2.36 | 0.52 | 0.64 | 0.78 | 0.83 |

TABLE 16

| Experiment | Total sulfur (wt. percent) | Viscosity at 50° C., cst. | Residual carbon (wt. percent) | Asphaltenes (wt. percent) | V (p.p.m.) | Ni (p.p.m.) | N (wt. percent) |
|---|---|---|---|---|---|---|---|
| Feed stock oil | 2.36 | 133.9 | 6.63 | 1.37 | 65 | 16 | 0.25 |
| Example 4 | 0.62 | 73.06 | 3.50 | 0.25 | 15 | 5 | 0.16 |
| Control 4 | 0.78 | 81.54 | 4.02 | 0.34 | 20 | 5 | 0.19 |

Thus, it is seen that activity of the catalyst prepared in accordance with the present invention is great as evident from a comparison with that of the catalyst of Control 4.

We claim:

1. In a process for the catalytic hydrogenation of distillation residuum-containing petroleum hydrocarbons which comprises contacting said hydrocarbons with a hydrogenatively active metal catalyst supported on a member selected from the group consisting of alumina and alumina-silica gels, said gel having a surface area of not less than 200 square meters per gram as determined by the B.E.T. method, a pore volume of not less than 0.5 cubic centimeters per gram, and a mean pore radius of not greater than 100 angstroms, in the presence of hydrogen; the improvement wherein (a) said gel is a dried gelled product obtained by heating a sol solution selected from the group consisting of a hydrosol of basic aluminum sulfate and a mixture of said hydrosol with a hydrosol of silica, (b) said gelled product has a surface area of 250–450 square meters per gram, a pore volume of 0.5–1.5 cubic centimeters per gram, and a mean pore radius of 40–100 angstroms, and (c) with a 10 angstrom width within said mean pore radius range, there is a peak which accounts for greater than 15% of said pore volume.

2. The process of claim 1 wherein said gelled product is a spherical gelled product obtained by passing said sol solution through a water-immiscible liquid medium heated at a temperature of 40–100° C.

3. The process of claim 1 wherein said hydrogenatively active metal is a metal selected from the group consisting of the metals of Groups VI and VII of the Periodic Table.

4. The process of claim 1 wherein said catalytic hydrogenation treatment is carried out under the conditions of a temperature of 300–500° C. and a pressure of 50–300 kilograms per square centimeter gauge.

5. The process of claim 1 wherein said hydrogenatively active metal catalyst is supported in an amount of 5–20% by weight based upon the weight of the supported catalyst.

6. The process of claim 4 wherein said catalytic hydrogenation treatment is carried out at a liquid hourly space velocity of the feedstock oil of 0.2–5 vol./vol./hr. and a flow rate ratio of hydrogen to feedstock oil of 300–3000 liter-NTP/liter.

References Cited

UNITED STATES PATENTS 3,684,688  8/1972  Roselius _____ 208—89

CURTIS R. DAVIS, Primary Examiner

UNITED STATES PATENT OFFICE
CERTIFICATE OF CORRECTION

Patent No. 3,766,057   Dated October 16, 1973

Inventor(s) YUTAKA OGUCHI ET AL

It is certified that error appears in the above-identified patent and that said Letters Patent are hereby corrected as shown below:

Column 16, claim 3, line 3 thereof: delete "VII" and insert --VIII-

Signed and sealed this 19th day of February 1974.

(SEAL)
Attest:

EDWARD M. FLETCHER, JR.
Attesting Officer

C. MARSHALL DANN
Commissioner of Patents